(12) United States Patent
Suoniemi et al.

(10) Patent No.: US 9,296,497 B2
(45) Date of Patent: Mar. 29, 2016

(54) DEVICE TO CAPTURE PARTICLES DETACHED FROM AN OBJECT BEING PROCESSED BY A TOOL

(75) Inventors: Arto Suoniemi, Ransta (SE); Magnus Emerius, Uppsala (SE)

(73) Assignee: Westinghouse Electric Sweden AB, Vasteras (SE)

( * ) Notice: Subject to any disclaimer, the term of this patent is extended or adjusted under 35 U.S.C. 154(b) by 261 days.

(21) Appl. No.: 13/807,118

(22) PCT Filed: Jul. 1, 2011

(86) PCT No.: PCT/SE2011/050896
§ 371 (c)(1),
(2), (4) Date: Feb. 13, 2013

(87) PCT Pub. No.: WO2012/002903
PCT Pub. Date: Jan. 5, 2012

(65) Prior Publication Data
US 2013/0133781 A1     May 30, 2013

(30) Foreign Application Priority Data
Jul. 2, 2010    (SE) ...................................... 1050728

(51) Int. Cl.
*B23Q 11/02*   (2006.01)
*B65B 1/28*    (2006.01)
*B23Q 11/00*   (2006.01)
*G21C 19/02*   (2006.01)
*B23B 47/34*   (2006.01)

(52) U.S. Cl.
CPC .............. *B65B 1/28* (2013.01); *B23Q 11/0042* (2013.01); *G21C 19/02* (2013.01); *B23B 47/34* (2013.01); *Y02P 70/171* (2015.11); *Y10T 408/50* (2015.01); *Y10T 409/304088* (2015.01)

(58) Field of Classification Search
USPC ............... 408/67; 409/137; 134/104.2, 104.3; 15/3, 104.001; 376/260
See application file for complete search history.

(56) References Cited

U.S. PATENT DOCUMENTS 2,278,886 A * 4/1942 Langbein et al. ............. 269/302
2,388,779 A * 11/1945 Boehmler ....................... 470/18
(Continued)

FOREIGN PATENT DOCUMENTS

| AU | 2005202845 A1 | 1/2006 |
| BE | 1013643 A3 | 5/2002 |
| DE | 4424452 A1 * | 1/1996 |
| DE | 19528429 A1 * | 2/1997 |
| FR | 2617072 A1 | 12/1988 |

(Continued)

OTHER PUBLICATIONS

International Preliminary Report on Patentability issued in corresponding PCT Application No. PCT/SE2011/050896 mailed on Jan. 8, 2013.

*Primary Examiner* — Daniel Howell
*Assistant Examiner* — Yasir Diab
(74) *Attorney, Agent, or Firm* — MKG, LLC

(57) ABSTRACT

The present invention relates to a device designed to capture the detached particles from an object being processed by the tool. The device includes an inlet opening to an internal space. The device includes guiding means configured to lead particles, which is detached during a machining process, the inner space of the container via the inlet opening and the inner space comprises a first material that has a consistency such that it has the ability to receive and retain detached particles, which are led into the inner space during the machining process.

14 Claims, 1 Drawing Sheet

(56) References Cited

U.S. PATENT DOCUMENTS

| | | | | |
|---|---|---|---|---|
| 2,847,880 | A | * | 8/1958 | Neidig ............................ 408/59 |
| 5,283,020 | A | * | 2/1994 | Gasper et al. ................. 264/46.6 |
| 6,210,086 | B1 | * | 4/2001 | Lecornet et al. .............. 409/137 |
| 6,547,497 | B2 | * | 4/2003 | Lof et al. ....................... 409/131 |
| 6,890,131 | B2 | * | 5/2005 | Alvarez-Vega ............... 408/1 R |

FOREIGN PATENT DOCUMENTS

| | | | |
|---|---|---|---|
| FR | 2795351 | A1 | 12/2000 |
| GB | 2443398 | A | 5/2008 |
| JP | 58132405 | A * | 8/1983 |
| SU | 1484588 | A * | 6/1989 |
| WO | 2008003132 | A1 | 1/2008 |

* cited by examiner

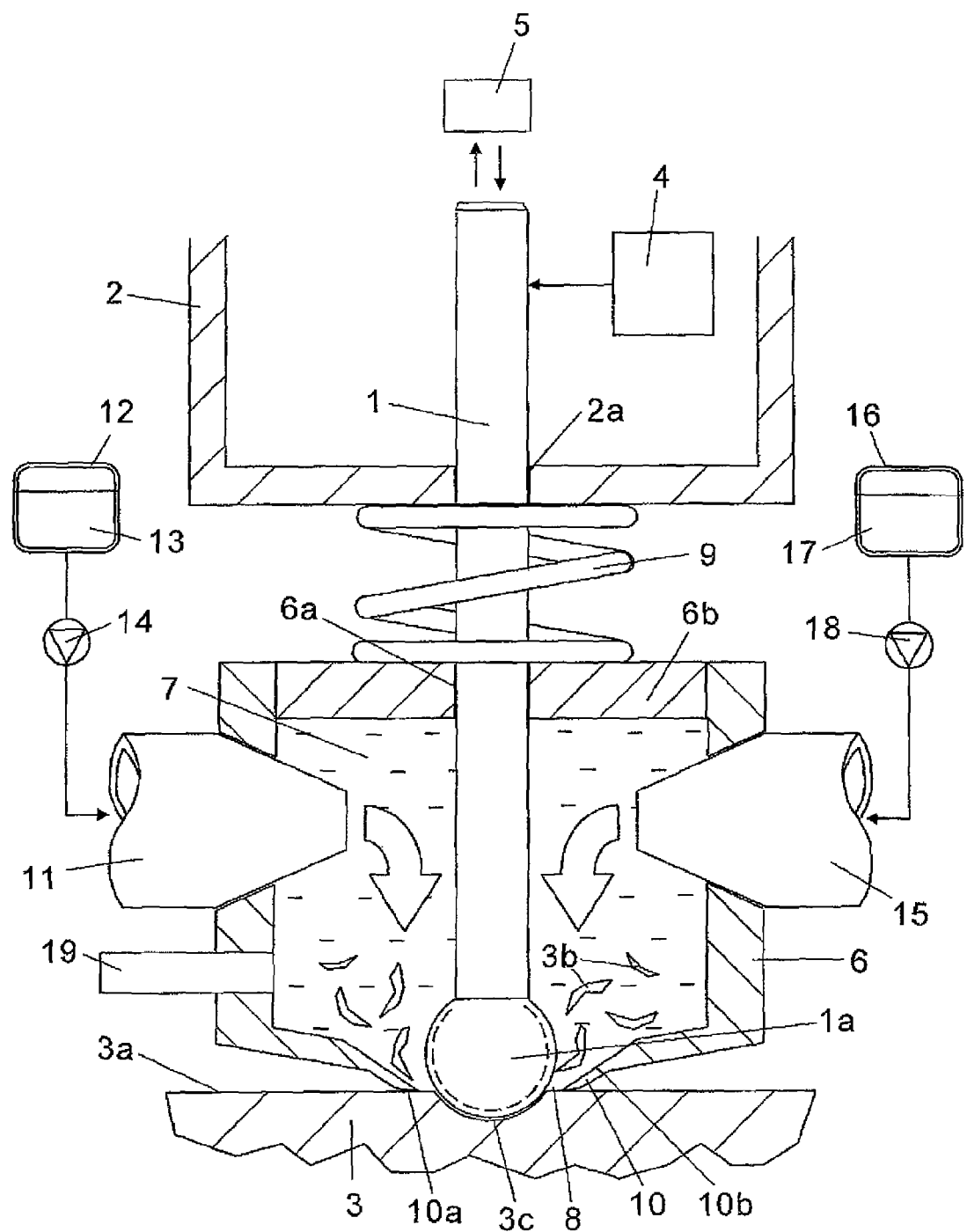

DEVICE TO CAPTURE PARTICLES DETACHED FROM AN OBJECT BEING PROCESSED BY A TOOL

FIELD

The present invention relates to a device for capturing particles detached from an object being processed by a tool, wherein the device comprises a container having an opening to an internal space.

BACKGROUND

During, for example, servicing and replacement of fuel assemblies in reactor tanks, the reactor tank is open. There is a risk that metal particles of different kinds, such as metal chips, may fall down into the reactor tank from work performed in connection with the reactor tank with, for example, cutting machining tools. Sometimes, work is also performed inside the reactor tank with cutting machining tools. In this case, machining tools can be brought down in the reactor tank and be attached to a wall surface in the reactor tank or the internal parts of the reactor tank by means of a suction cup device or another mechanical attachment device. After such a device has been attached to the wall surface, the tool can be activated in order to process the wall surface. It is of great importance that the metal chips and similar particles formed during the work are collected in an efficient manner.

During a subsequent operation, such small metal particles are circulated around in the reactor with the reactor water. The particles can cause abrasion damage to sensitive parts of the reactor tank such as the fuel rods. The particles can essentially not leave the reactor, but they accumulate over time in a growing number inside the reactor tank.

However, it is known to provide reactor tanks with different types of filters in which such particles are captured. Such filters need to be emptied and there is always a risk that loose particles have time to get stuck in an inappropriate place in a reactor tank before they are captured in such a filter.

SUMMARY

An object of the present invention is to provide a device that is guaranteed to capture and retain all loose particles that are formed when a tool processes a surface of an object.

This object is achieved with the initially mentioned device characterised in that the device comprises guiding means configured to lead particles, which are detached during a machining process, into the internal space of the container via said opening and that the internal space contains a first material having a consistency such that it has the ability to receive and retain detached particles which are led into the internal space during the machining process. By giving said guiding means a suitable design, substantially all formed particles may be led into the internal space of the container in which they are retained in an efficient manner by the first material. Such a first material may have a viscous or paste-like consistency. However, the first material ought to have a consistency such that the formed particles can be introduced into the material with a relatively small resistance. On the other hand, the material has to have consistency such the particles are retained by the material. Thereby, the tool with the container may also be removed from the workplace without the risk that captured particles fall out. A waxy substance with suitable properties may constitute such a first material.

According to an embodiment of the present invention, the first material is hardenable and that the device comprises hardening means which is configured to harden the first material such that it changes to a solid state after a machining process has been completed. When the first material is hardened, it forms a solid material body that encloses the captured particles. Thus, there is no risk that single particles fall out from the container. The risk that parts of the first material fall out from the container is thereby eliminated. The first material can be hardened when it comes in contact with hardening means such as ambient air, water, natural light, ultraviolet light, infrared light, etc. It is also possible to arrange a source in connection with the container which, for example, emits ultraviolet light against the first material when it is has to be hardened.

According to an advantageous embodiment of the present invention, said hardening means comprises a supply of a hardening material which is mixed with the first material in the internal space such that a hardening of the first material is obtained. In this case, a hardenable material is supplied which preferably reacts chemically with the first material such that it hardens and forms a rigid material body. Advantageously, the first material has the property that it is hardened a certain time after the materials have been mixed. As long as the machining process continues, the first material should have a consistency that allows it to capture the particles formed during the machining process. As soon as the machining process is completed, the hardening ought to take place as soon as possible. The hardening ought to proceed before the container is removed from the object.

According to another embodiment of the present invention, the device comprises a connection for supply of the first material to the internal space container. With such a connection, the container may be first arranged in a working position in relation to an object to be processed before the first material is supplied to the container. This is particularly an advantage when the work should be done in hard to reach spaces and when possible material in the internal space risks to fall out on the way to the working position. In this case, the device may also comprise a connection for supply of the hardening material to the internal space of the container. By supplying these materials to the internal space simultaneously, a good mixing effect may be obtained. However, the internal space may be provided with a mixing device of a suitable kind ensuring that the materials are mixed in an appropriate manner.

According to another embodiment of the present invention, the first material is burnable in a hardened state. In certain cases, one wishes to examine the particles detached at the machining processes. In this case, one can heat up the solid material body which encloses the metal particles to a temperature at which the material body is burned. Thereby the contained metal particles may be released and studied. Alternatively, the first material may have a lower melting point than the detached particles from said object which are retained inside the first material. As a non-hardening first material, such as a waxy substance, is used this may be an alternative to release contained particles.

According to an embodiment of the present invention, said guiding means comprises a contact portion with a contact surface in connection with the tool opening which is configured to abut a surface of an object processed by the tool. Thereby, a close contact may be obtained between the container and the object which prevents that the first material leaks out from the container during a machining process. Advantageously, the contact surface of the container has a design such that it extends completely around a machining portion of the tool which is in contact with and processes a surface of the object. With such a contact portion, the inlet opening to the container may completely enclose the machining portion of the tool and prevent the particles from the machining process from being led in directions other than into the internal space of the container. The contact portion may comprise a control surface located internally of the contact surface which is configured to lead detached particles to the internal space. Thereby, the introduction of the formed particles to the internal space inside the container is facilitated.

According to an embodiment of the present invention, the device comprises spring means configured to hold the container with a resilient force against a surface of the object when the tool performs a machining process. Thereby a closed connection between the container and the object is maintained substantially independent of the position of the tool. At least part of the tool may be in contact with the first material inside the internal space of the container. In this case, the motions of the tool may provide mixing motions that facilitate the hardening of the first material. The container may have a second opening and the tool extends into the internal space of the container via the second opening. Advantageously, such a second opening is arranged on an opposite side of the container in relation to the inlet opening such that an elongated tool may extend across the container.

According to an embodiment of the present invention, the device comprises a shift mechanism configured to provide a shifting motion of the tool from an active position to an inactive position after a machining process has been completed such that the first material can come in contact with possible remaining particles in the area which has been in contact with the tool. When a machining process has been completed, there may be loose particles between the machining portion of the tool and the surface of the object. In order to harden that such particles are also are received in the first material, the tool is thus shifted at a distance from the object when work has been completed. Thereby, a first material with a viscous consistency may penetrate into a depression or the like accomplished by tool and to capture possible loose particles. In this case, the first material obtains a cast of the machined surface. Thereby information may be obtained about the geometry of the machined surface. Alternatively, an image of the machined surface may be performed with a following container arranged around the machined surface whereupon a material is supplied which is formed after the machined surface.

BRIEF DESCRIPTION OF THE DRAWINGS

In the following, a preferred embodiment of the invention is described as an example with reference to the attached drawing, on which:

FIG. 1 shows a tool for mechanical machining according to the present invention.

DETAILED DESCRIPTION

FIG. 1 shows part of an apparatus for mechanical machining. The apparatus comprises a mechanical machining tool 1, which in this case is a cutter. Alternatively, the machining tool is designed for drilling, grinding, sanding, etc. Advantageously, the device may be carried by a suction cup device or the like for performing repair work inside a reactor tank. The suction cup device may be brought down in the reactor tank and positioning the device in connection with a wall surface where a mechanical maching is to be performed. At a mechanical machining, metal particles are inevitably released in the form of chips or the like. It is of great importance that such metal particles are collected in an efficient manner such that they will not be left in the reactor tank where they may cause abrasion damage to sensitive parts of the reactor tank such as fuel rods.

The apparatus comprises a schematically shown house 2. The house 2 comprises an opening 2a, such that an end of the tool 1 can be arranged inside the house 2. An opposite end of the tool 1 comprises a machining portion 1a which is configured to process a surface 3a of an object 3 inside, for example, a reactor tank. The house 2 contains a schematically disclosed drive mechanism 4 for operation of the tool 1. The drive mechanism 4 is, in this case, configured to provide a rotary motion to the tool 1. A schematically shown shift mechanism 5 is configured to bring the tool in an axial direction between an active position and an inactive position.

The apparatus comprises a device to capture detached particles 3b when the object 3 is processed by the tool 1. The device comprises a container 6 which has an internal space 7. An inlet opening 8 to the internal space 7 of the container is arranged in connection with the machining portion 1a of the tool. The tool 1 extends into the container 6 via an opening 6a and a small piece out of the container 6 at the inlet opening 8. A spring member 9 allows a resilient axial motion of the container 6 in relation to the tool 1. The container 6 has a contact portion 10 in connection with the inlet opening 8. The contact portion 10 has a contact surface 10a that is configured to abut the surface 3a of the object when the object 3 is processed by the tool 1. The contact surface 10a is designed such that it extends completely around the machining portion 1a of the tool. The contact portion 10 comprises a guiding surface 10b located internally of the contact surface 10a. The guiding surface 10b is configured to lead detached particles 3b into the internal space 7.

The container 6 comprises a first connection for supply of a first material 13 to the internal space 7. The first material has a slightly viscous consistency or paste-like consistency. The connection comprises a line 11 leading the first material 13 from a first storage container 12 to the internal space 7 of the tank 6 by means of a first feeding member 14. The container 6 comprises a second connection for supply of a second material 17 to the internal space 7. The second connection comprises a line 15 leading a second material from a second storage container 16 to the internal space 7 of the container 6 by means of a second feeding member 18. The second material is a hardenable material which, when it is mixed with the first material, provides a chemical reaction such that the first material 13 hardens and changes to a solid state. The first material 13 hardens and changes to the solid state a certain time after the materials have been mixed. An exhaust pipe 19 for water is connected to the container 6.

When a mechanical machining of an object 3 in, for example, a reactor tank is to be performed, the apparatus is connected to a suction cup device or similar attachable device. The suction cup device is brought down in the reactor tank to a determined position in relation to the object 3. The suction cups of the suction cup device are attached to the surface 3a of the object such that the tool obtains a desired position in relation to the object 3 to be processed. The suction cup device may be controlled by an operator standing on the side of a reactor basin or on a bridge extending over the reactor basin. The reactor basin and the reactor tank are filled with reactor water. Thereafter, the operator activates the apparatus such that the house 2 is moved to a machining position in relation to the surface 3a of the object. The spring member 9 presses, in this position, the contact surface 10a of the container 6 against the surface of the object 3 with a suitable spring force. The contact portion 10 of the container 6 forms in the machining position a sealed connection between the container 6 and the surface 3a of the object.

The first feeding member 14 is activated such that the first material 13 is fed into the internal space 7 of the container 6. Simultaneously, the second feeding member 18 is activated, which fed the second material 17 into the internal space 7 of the container 6. The second hardening material 17 is usually fed in a much smaller amount than the first material. Existing water inside the inner space is evacuated through the evacuation pipe 19 in connection with the fed of the two materials 13, 17. Advantageously, the evacuation pipe 19 is translucent. Thereby, it is possible to detect when the supplied materials 13, 17 begin to penetrate into the evacuation pipe 19 by means of a camera on the suction cup device. Thereby, all the water inside the container 6 has probably been evacuated. When the two materials 13, 17 are led into the internal space 7, they provide, in most cases, a good mix. Alternatively, the device may comprise a mixing body which mixes the first material 13 and the second material 17. The close contact between the contact surface 10a and the surface 3a of the object hardens that the supplied materials 13, 17 are maintained inside the container 6.

After the container 6 has been filled with the first material 13 and the second material 17, the drive mechanism 4 is activated such that the tool 1 obtains a rotary motion. In this case, the rotary machining portion 1a provides a depression 3c in the surface 3a of the object. The materials cut away by the machining portion 1a form particles 3b in the form of metal chips. Usually, the rotary machining portion 1a gives the detached particles 3b a motion in at least one direction. The inclined guiding surfaces 10b help to guide the particles 3b into the inner space 7 which are not directly led into the internal space 7. Possibly, the tool 1 provides motions in the supplied materials 13, 17 resulting in that the detached particles 3b are gradually led further into the internal space 7. Such motions in the materials 13, 17 also promote a good mixing between the supplied materials 13, 17. The first material 13 and the second material 17 have a consistency such that they have the ability to receive and retain detached particles led into the internal space 7. They have a consistency that is so loose such that the particles 3b relatively easily penetrate into the material 13, 17. They have also a consistency that is so solid, such that the particles 3b substantially are retained inside the materials 13, 17 in existing positions i.e. they will not fall down in the materials 13, 17 by their own weight.

When the machining process is completed, the drive mechanism 4 stops the drive of the tool 1. The shift mechanism 5 moves the tool 1 to an inactive position inside the container such that the machining portion 1a is shifted some distance from the surface 3a of the object. Thereby, the mixture of the two materials 13, 17 may come into contact with possible loose particles 3b which are located in connection with the depression 3c created by the tool. After the two materials 13, 17 have been mixed in the internal space 7 of the container 6, a hardening of the first material take place after a certain time. Thereby, the first material 13 is transferred to a solid state. With knowledge of the hardening time of the first material, the operator 13 knows how long time the machining process maximum may take up. When the machining process is completed, the operator must wait until the first material 13 has hardened before the container 6 is released from the surface 3a of the object. When the first material has hardened 13, it forms a solid continuous material body enclosing the captured particles 13b during the machining process. In this case, the solid body obtains a cast of the pit 3c. Thus, information may be obtained about the geometry of the pit 3c.

The apparatus is shifted from the machining position and the contact portion 10 is removed from the surface 3b of the object. Since the supplied materials now consist of a solid material body, there is no risk that the particles 3b or parts of the material coming loose and falling down in the reactor tank. Suction cup device is lifted up from the reactor basin and the container 6 with the tool is released from the apparatus. The container 6 with the tool 1 may thereafter be applied in an oven or similar heat source where they are heated up to a suitable temperature which may be about 300° C. In this case, the solid material body has the property that is burnable at this temperature. When the solid material body has been burned, the tool can be released from the container 6 and the metal particles 3b collected. Hereby, the material particles 3b may be examined and their radioactive radiation 3 can, for example, be measured.

The present invention is not restricted to the above described embodiments in the drawings but may be varied freely within the scope of the claims. In this case, a hardenable material is supplied in order to provide a hardening of the first material. However, it is possible to use a first material that hardens without the addition of a hardening material. The first material may have the property that it hardens when it comes in contact with air, water or ambient light. The first material can also be hardened by the exposure to, for example, ultraviolet light from a source arranged in connection with to the container. It is also possible to use a first material which does not need to be hardened. It may have a consistency such that it both receives and retains particles in a hardened manner without the need to be hardened. Such a first material may be a waxy substance that has a suitable consistency for this purpose. In order to release the metal particles inside the waxy substance, the container may also in this case be heated up. In this case, the waxy substance can melt such that the particles will be released. In the example above, the internal space of the container is filled with suitable materials after the tool has been applied in a machining position. However, it is possible to fill the container with a first material and possibly hardening material before the apparatus is applied in a machining position.

What is claimed is:

1. A device for capturing detached particles from an object being processed by a tool, wherein the device comprises:
   a container having an inlet opening to an inner space, guiding surfaces configured to lead particles, which are detached during a machining process, into the inner space of the container via the inlet opening and that the inner space contains a first material having a consistency such that it has the ability to receive and retain detached particles, which are led into the inner space during the machining process,
   wherein the first material is hardenable and that the device comprises hardening means, the hardening means comprises a supply of hardening material which is mixed with the first material such that the hardening material reacts chemically with the first material and the materials together form a rigid material body after a machining process has been completed.

2. A device according to claim 1, wherein said supply of hardening material is mixed with the first material in the inner space.

3. A device according to claim 2, wherein the first material has the property that it is hardened a certain time after the materials have been mixed.

4. A device according to claim 1 further comprising a connection for supply of the first material to the inner space of the container.

5. A device according to claim 2 further comprising a connection for supplying the hardening material to the inner space of the container.

6. A device according to claim 1, wherein the first material is burnable in a hardened state.

7. A device according to claim 1, wherein the first material has a lower melting point than the detached particles from said object, which are retained inside the first material.

8. A device according to claim 1, wherein said guiding surfaces comprise a contact portion with a contact surface in connection with the inlet opening, wherein the contact surface is configured to abut a surface of an object being processed by the tool.

9. A device according to claim 8, wherein the contact surface of the container has a design such that it extends completely around a working portion of the tool which is in contact with and processes a surface of the object.

10. A device according to claim 8, wherein the contact portion comprises a guiding surface located internally of the contact surface, wherein the guiding surface is configured to lead the detached particles to the internal space.

11. A device according to claim 1 further comprising a resilient member configured to hold the container with a resilient force against a surface of the object when the tool performs a machining process.

12. A device according to claim 1, wherein at least part of the tool is in contact with the first material inside the inner space of the container.

13. A device according to claim 12, wherein the container has a second opening and that the tool extends into the inner space of the container via the second opening.

14. A device according to claim 1 further comprising a shift mechanism that is configured to provide a shifting motion of the tool from active position to an inactive position after a machining process has been completed such that the first material is able to come into contact with possible remaining particles in that area that has been in contact with the tool.

* * * * *